April 1, 1969 — L. B. SHERROD, JR — 3,435,903
PULL HOE
Filed March 29, 1967

INVENTOR.
LEWIS B. SHERROD, JR.

BY *Frank C. Leach jr.*

ATTORNEY.

United States Patent Office 3,435,903
Patented Apr. 1, 1969

3,435,903
PULL HOE
Lewis B. Sherrod, Jr., Bowman Mill Road, Rte. 1, Lexington, Ky. 40503
Filed Mar. 29, 1967, Ser. No. 626,811
Int. Cl. A01b 1/08
U.S. Cl. 172—376                    10 Claims

ABSTRACT OF THE DISCLOSURE

A pull hoe comprises a handle and a strip of sheet metal. The strip of sheet metal is formed to have support portions, which are substantially parallel to the handle and attached thereto, and first arms extending forwardly from the support portions. The first arms also extend outwardly and upwardly away from the support portions. The strip has second arms extending from the forward ends of the first arms at an angle to the first arms and substantially parallel to the support portions. A concave curved blade connects the forward ends of the second arms. The first arms and the second arms are inclined from their bottom edges to their top edges so that the opening at the bottom of the strip is larger than the opening at the top the strip. A plane through the longitudinal axis of the handle intersects the entire length of each part of the strip.

---

Pull hoes are pulled through the ground to loosen the soil without creating a path through which the hoe is moved. Thus, pull hoes are designed so that the loosened soil will return to the area from which it is displaced.

In prior pull hoes, the cutting blade has been disposed substantially horizontal to the surface of the ground when the handle of the hoe is held in a normal pulling position. With the blade disposed in a horizontal position, a substantial force must be exerted on the handle to pull the blade through the soil.

The present invention satisfactorily overcomes this problem by positioning the blade with respect to the handle so that the blade is disposed at angle to the surface of the ground when the handle is held in the usual position for pulling the blade through the soil. Thus, the present invention permits easier pulling of a pull hoe through the soil.

In prior pull hoes, the blade was disposed substantially perpendicular to the line of pull. As a result, the complete cutting edge of the blade attempted to cut through the soil at the same time. This also required a substantial pulling force.

The present invention satisfactorily overcomes this problem by curving the blade. As a result, only the center portion of the cutting edge of the curved blade initially contacts the soil so that a slicing action is produced whereby a much smaller force must be exerted on the pull hoe of the present invention to pull is through the soil than with the prior pull hoses.

When using a pull hoe, it is desired to shake the roots of all weeds loose from the soil. Thus, a pull hoe eliminates the chopping action required when using an ordinary garden hoe to remove weeds.

However, prior pull hoses, which have utilized a blade disposed substantially horizontal to the surface of the ground when the handle of the hoe is in the usual position in which the hoe is pulled, have not completely shaken loose the roots of the weeds from the soil. That is, as the horizontal blade of the prior pull hoe moves through the ground, it may move beneath the bottom of the root of the weed but does not shake the weed loose from the soil since the soil is merely loosened and not shifted. Furthermore, because of the large effort required to pull the blade through the soil when the blade is disposed horizontal, the cutting edge of the blade may not penetrate the soil to a sufficient depth to completely dislodge the root of the weed from the soil. Accordingly, the weed will continue to grow.

The present invention satisfactorily eliminates this problem by causing the soil, which has been loosened, to be lifted up and over the blade of the hoe. This lifting action of the soil insures that the roots of the weed is completely shaken loose from the soil. Furthermore, the blade of the pull hoe of the present invention is capable of penetrating a sufficient depth into the soil to be disposed so that the cutting edge of the blade will be beneath the roots of the weeds.

In the prior pull hoes in which the blade is disposed horizontal when the hoe handle is positioned for pulling the hoe through the soil, there is not only a substantially large force required to exert this pull but it also is exerted at an angle to the blade structure so as to cause weakening thereof. The present invention satisfactorily overcomes this problem by disposing the blade and its connecting parts so that a horizontal plane through the longitudinal axis of the handle of the hoe intersects the blade and all of its connecting portions throughout their entire lengths. Thus, no force moments are created on the blade or its connecting portions when a force is exerted on the handle as in the prior pull hoes. Therefore, the strength of the pull hoe of the present invention is substantially greater than the prior pull hoes.

An object of this invention is to provide a pull hoe that may be easily pulled through the soil.

Another object of this invention is to provide a pull hoe that lifts and shifts the loosened soil.

A further object of the invention is to provide a pull hoe that is relatively strong.

Other objects of this invention will be readily perceived from the following description, claims, and drawing.

This invention relates to a pull hoe comprising a handle and a strip of sheet metal. The strip includes a pair of support portions disposed in the plane of the handle and a first arm extending forwardly from each of the support portions. The first arms extend away from each other. The strip also includes a second arm extending forwardly from each of the first arms with a blade extending between the forward ends of the second arms. The support portions of the strip are secured to the handle by suitable means, and the blade has its lower edge sharpened. The first arms extend upwardly from the support portions with the second arms extending downwardly from the first arms toward the blade. Each of the support portions, each of the first arms, each of the second arms, and the blade is intersected throughout its length by a plane containing the longitudinal axis of the handle. The blade has its lower edge beneath the plane containing the longitudinal axis of the handle.

The attached drawing illustrates a preferred embodiment of the invention, in which.

Figure 1:
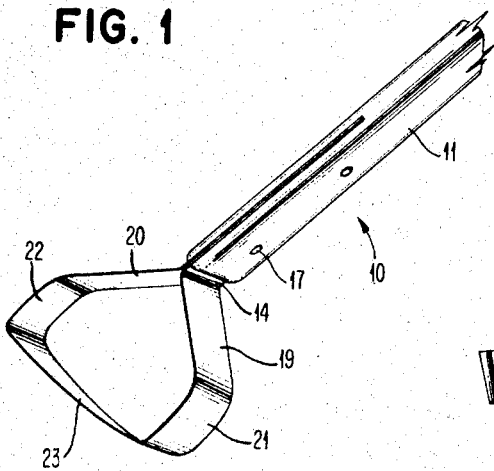
FIGURE 1 is a perspective view of the pull hoe of the present invention.

Referring to the drawing, there is shown a pull hoe 10 of the present invention. The hoe 10 includes a handle 11, which is preferably formed of wood, and a strip 12 of sheet metal. The strip 12 is preferably twenty gage steel having a width of 1¼ inches.

The strip 12 is formed by bending so as to have a pair of support portions 14 and 15 disposed parallel to each other. The portions 14 and 15 are inserted within a longitudinal slot 16 in the handle 11 so as to be held in contact with each other. Suitable means such as pins 17 fixedly attach the support portions 14 and 15 to the handle 11.

While the support portions 14 and 15 are shown disposed within the slot 16 in the handle 11, the portions 14 and 15 could be positioned on the exterior of the handle 11 and secured thereto by suitable means. It is preferred that the support portions 14 and 15 have a height no greater than the height of the handle 11.

Figure 2:
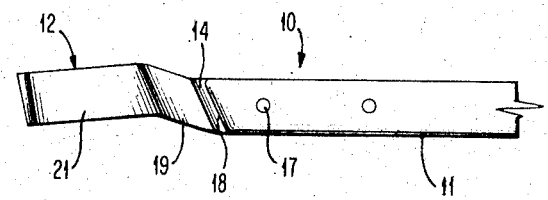
FIGURE 2 is a side elevational view of the hoe of the present invention.

As shown in FIGURE 2, the handle 11 has its front end 18 inclined from top to bottom. The forward ends of the support portions 14 and 15, which extend beyond the end 18 of the handle 11, have first arms 19 and 20, respectively, extending from the support portions 14 and 15, respectively. As shown in FIGURE 2, the intersection of the first arm 19 with the support portion 14 is along a line, which is substantially parallel to the end 18 of the handle 11. The intersection of the first arm 20 with the support portion 15 is along a line, which is substantially parallel to the forward end 18 of the handle 11.

Figure 3:
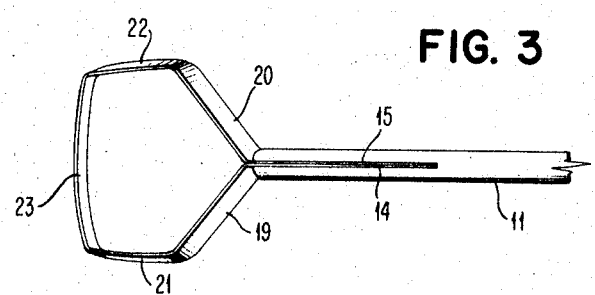
FIGURE 3 is a top plan view of the hoe of the present invention.

When viewed from above as shown in FIGURE 3, each of the first arms 19 and 20 extends outwardly at an angle of approximately 45° from the connected support portions 14 and 15. Each of the first arms 19 and 20 is tilted or inclined inwardly from its lower edge to its upper edge so that the upper edges of the first arms 19 and 20 are closer to each other than the lower edges.

In addition to extending forwardly and outwardly from the portions 14 and 15, respectively, the support arms 19 and 20 also extend upwardly with respect to the support portions 14 and 15 (see FIGURE 2). Accordingly, the forward ends of the first arms 19 and 20 are disposed in a plane above the upper edges of the support portions 14 and 15 when the handle 11 is horizontally disposed as shown in FIGURE 2.

The strip 12 includes second arms 21 and 22, which extend forwardly from the first arms 19 and 20, respectively. When viewed from above (see FIGURE 3), the second arms 21 and 22 are disposed substantially parallel to the support portions 14 and 15. However, because of the inward tilt of each of the second arms 21 and 22 from its lower edge to its upper edge whereby the upper edges of the second arms 21 and 22 are closer to each other than the lower edges, the lower edges of the second arms 21 and 22 are disposed at a slight angle to the support portions 14 and 15.

The second arms 21 and 22 extend downwardly from the connection to the first arms 19 and 20, respectively. Thus, when viewed from the side (see FIGURE 2), the upper edges of the second arms 21 and 22 are highest adjacent the intersection with the first arms 19 and 20, respectively.

Figure 4:
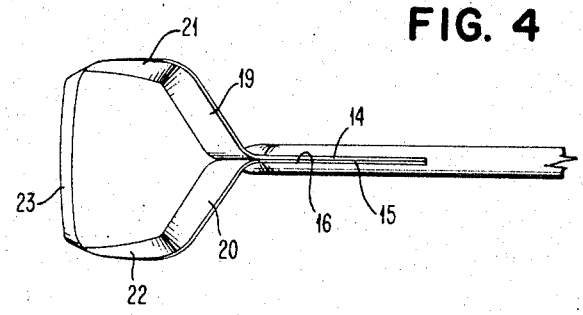
FIGURE 4 is a bottom plan view of the hoe of the present invention.

A blade 23, which is sharpened along its entire lower edge to form a cutting edge, extends between the forward ends of the second arms 21 and 22. As shown in FIGURES 1, 3, and 4, the blade 23 has a concave curve shape. Furthermore, the blade 23 is tilted or inclined outwardly from its lower edge to its upper edge so that its lower edge is closer to the handle 16 than its upper edge.

Figure 5:
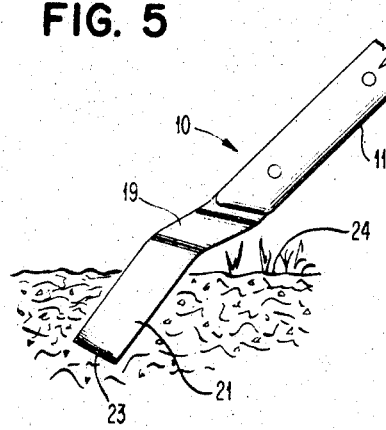
FIGURE 5 is a view showing the hoe disposed within the soil for pulling therethrough.

As a result of the inward tilt of the first arms 19 and 20 and the second arms 21 and 22 from their lower edges to their upper edges, the area of the opening defined by the strip 12 is greater at its bottom than at its top notwithstanding the outward tilt of the blade 23 from its lower edge to its upper edge. Thus, when the hoe 10 is pulled through the soil as illustrated in FIGURE 5, the soil must exit through a smaller opening at the top of the strip 12 than the opening through which it enters at the bottom of the strip 12. As a result, the soil is compressed whereby loosening and aeration of the soil occurs.

With the hoe 10 disposed so that the handle 11 is held in the usual position by a user to pull the blade 23 through the soil, the blade 23 is disposed at an angle to ground surface 24 (see FIGURE 5) rather than horizontal thereto as in the prior pull hoes. Additionally, because of the curvature of the blade 23, the center portion, which is aligned with the handle 11, makes initial contact with the soil to cause a slicing action. Thus, the entire lower or cutting edge of the blade 23 does not make initial contact with the soil. This permits easier entrance of the blade 23 into the soil.

In addition to the blade 23 having its lower edge sharpened, the entire lower edge of each of the second arms 21 and 22 is preferably sharpened. This permits easier pulling of the hoe 10 through the soil.

As shown in FIGURE 2 with the hoe 10 disposed so the handle 11 is horizontal, a horizontal plane through the longitudinal axis of the handle 11 intersects the entire length of each of the support portions 14 and 15, the first arms 19 and 20, the second arms 21 and 22, and the blade 23. Accordingly, when a pulling force is exerted on the handle 11, it is transmitted through the entire length of each of the parts of the strip 12 so that no undesired bending moments are created on any portion of the strip 12 because of the pulling force on the handle 11. In the claims, the reference to "plane" containing the longitudinal axis of the handle 11 is this horizontal plane.

As an example of the various relationships and dimensions of the hoe 10, the lower edge of the handle 11 may extend sixteen inches. The support portions 14 and 15 extend one-quarter inch beyond the forward end 18 of the handle 11. The distance of the forwardmost point of the upper edge of the blade 23 from the upper edge of the forward end 18 of the handle 11 is 3⅝ inches while the distance from the forwardmost point of the lower edge of the blade 23 to the lower edge of the forward end 18 of the handle 11 is 3⅞ inches. The distance between the outermost ends of the upper edges of the second arms 21 and 22 is 3¾ inches.

The first arms 19 and 20 are preferably inclined at an angle of 18° to the plane containing the top edge of the handle 11. Each of the second arms 21 and 22 is inclined at an angle of 25° with respect to the connected first arms 19 and 20. The blade 23 is preferably formed at an angle of 13° to the vertical.

With this angular arrangement of the parts of the strip 12, approximately one-third of the height of the blade 23 is disposed beneath the horizontal plane, which passes through the longitudinal axis of the handle 11 and intersects the entire length of each of the first arms 19 and 20, the second arms 21 and 22, and the blade 23. This is the preferred position of the lower cutting edge of the blade 23 with respect to the longitudinal axis of the handle 11. Of course, the cutting edge of the blade 23 could be disposed at other distances from the plane containing the longitudinal axis of the handle 11 as long as the first arms 19 and 20, the second arms 21 and 22, and the blade 23 are intersected by the horizontal plane throughout their lengths.

While the lower edge of each of the second arms 21 and 22 is preferably sharpened along its entire length, it could be sharpened only along a portion adjacent the blade 23 or not sharpened at all. Of course, this reduces the efficiency of the pull hoe 10 of the present invention.

While the blade 23 has been shown and described as having a concave curve, is should be understood that it could be straight. This would cause the soil to still be lifted up over the blade 23 as when the blade is curved. However, it would require a greater pulling effort since the desirable slicing action would not be presented.

By both tilting or inclining the various parts of the strip 12 and inclining the parts of the strip 12 relative to each other, the strip 12 of the pull hoe 10 of the present invention may be formed without any heat treatment. Thus, the strip 12 may be a relatively inexpensive material with relatively inexpensive forming thereof.

An advantage of this invention is that there is effective loosening of soil. Another advantage of this invention is that the soil is not deposited outside of the path through which the pull hoe is moved so that seedlings or the like do not have loosened soil deposited thereon. A further advantage of this invention is that it insures that the roots of weeds are completely removed from the soil. Still another advantage of this invention is that the pull hoe may be formed of relatively inexpensive material.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. A pull hoe comprising a handle; a strip of sheet metal; said strip including a pair of support portions disposed in the plane of said handle, a first arm extending forwardly from each of said support portions, said first arms extending away from each other, a second arm extending forwardly from each of said first arms, and a blade extending between the forward ends of said second arms; means to secure said support portions of said strip to said handle; said blade having its lower edge sharpened; said first arms extending upwardly from said support portions; said second arms extending downwardly from said first arms toward said blade; each of said support portions, each of said first arms, each of said second arms, and said blade being intersected throughout its length by a plane containing the longitudinal axis of said handle; and said blade having its lower edge beneath said plane containing the longitudinal axis of said handle.

2. The hoe according to claim 1 in which said plane containing the longitudinal axis of said handle intersects said blade closer to its lower edge at approximately one-third of the height of said blade.

3. The hoe according to claim 2 in which said blade extends in a concave curve between the ends of said second arms.

4. The hoe according to claim 2 in which each of said first arms is inclined so that its upper edges are closer to each other than its lower edges and each of said second arms is inclined so that its upper edges are closer to each other than its lower edges.

5. The hoe according to claim 1 in which said blade extends in a concave curve between the ends of said second arms.

6. The hoe according to claim 5 in which the area of the opening formed by said first arms, said second arms, and said blade is greater adjacent the lower edges than the upper edges.

7. The hoe according to claim 5 in which each of said first arms is inclined so that its upper edges are closer to each other than its lower edges and each of said second arms is inclined so that its upper edges are closer to each other than its lower edges.

8. The hoe according to claim 7 in which each of said second arms has its lower edge sharpened along its entire length.

9. The hoe according to claim 1 in which the area of the opening formed by said first arms, said second arms, and said blade is greater adjacent the lower edges than the upper edges.

10. The hoe according to claim 1 in which each of said first arms is inclined so that its upper edges are closer to each other than its lower edges and each of said second arms is inclined so that its upper edges are closer to each other than its lower edges.

References Cited

UNITED STATES PATENTS

| 896,494 | 8/1908 | Wenner | 172—376 |
| 1,895,055 | 1/1933 | Steinour et al. | 172—380 X |
| 2,331,414 | 10/1943 | Morres | 172—380 X |

ABRAHAM G. STONE, *Primary Examiner.*

R. C. HARRINGTON, *Assistant Examiner.*